Aug. 12, 1958 S. G. ESKIN Re. 24,515

COMBINATION OVER-TEMPERATURE SHUT-OFF AND FLAME SAFETY VALVE

Original Filed Aug. 3, 1953

Inventor
Samuel G. Eskin

By Weil, Gotshal, Manges, Green & Seaman Attys

United States Patent Office

Re. 24,515
Reissued Aug. 12, 1958

24,515

COMBINATION OVER-TEMPERATURE SHUT-OFF AND FLAME SAFETY VALVE

Samuel G. Eskin, Chicago, Ill., assignor to The Dole Valve Company, Chicago, Ill., a corporation of Illinois Original No. 2,758,642, dated August 14, 1956, Serial No. 371,875, August 3, 1953. Application for reissue July 19, 1957, Serial No. 673,751

12 Claims. (Cl. 158—142)

Figure 2:
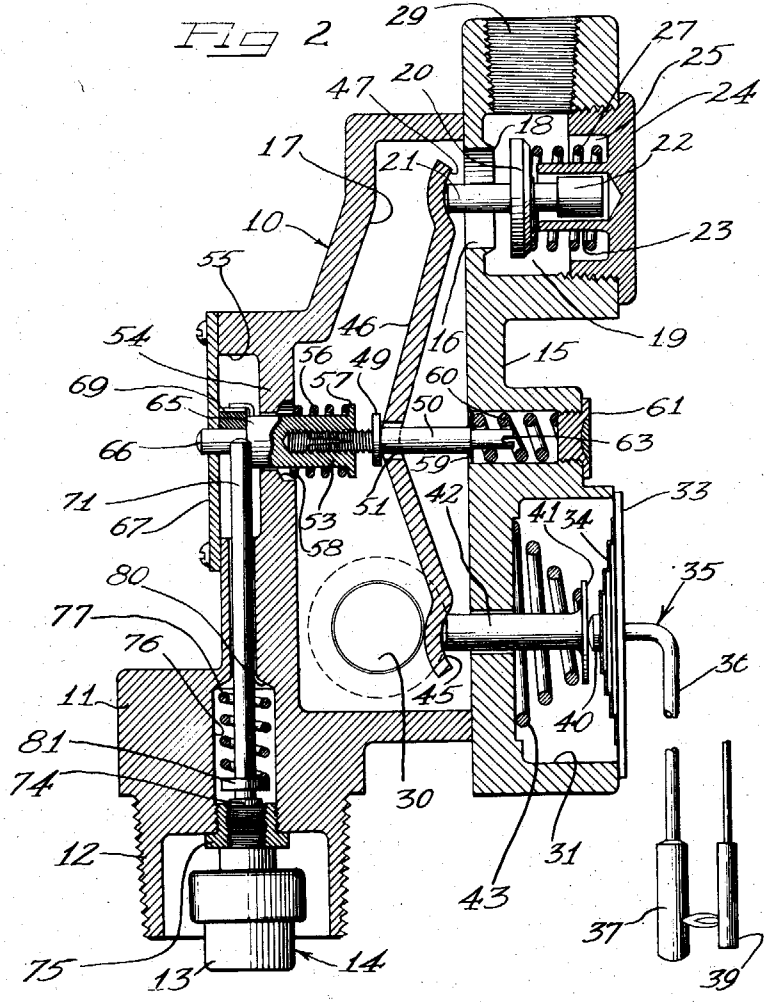

Matter enclosed in heavy brackets [ ] appears in the original patent but forms no part of this reissue specification; matter printed in italics indicates the additions made by reissue.

This invention relates to safety devices for gas heating units and more particularly relates to an improved over-temperature shut-off valve arranged to shut off the supply of gas to a main gas burner upon over-temperature conditions.

In gas heaters it is desirable to prevent the temperature of water in the storage tank from exceeding its boiling point. This has formerly been attained by relief valves, opening to release the hot water from the tank upon excessive pressure conditions within the tank. Such valves however, become exposed to the corrosive and scale forming action of the water and frequently fail to operate, due to corrosion of the valve parts, and also discharge the hot water directly onto the floor, which is extremely disadvantageous where the hot water heaters are in the kitchen, closet or basement at a distance from the drain.

A principal object of my invention is to remedy the foregoing difficulties by providing a simple and novel form of valve, shutting off the supply of gas to the main gas burner of a hot water heater upon over-temperature conditions.

Another and important object of my invention is to provide a new, improved and effective safety device for gas heated hot water heaters arranged to prevent the hot water from reaching its boiling point by shutting off the main gas burner upon over-temperature of the water.

A further object of my invention is to provide an effective safety device for gas hot water heaters in which the casing of a power type thermostat is immersed in the water within the heater and releases a gas supply valve to close upon over-temperature conditions.

A further object of my invention is to provide a simple and improved form of valve, controlling the supply of gas to a main gas burner, in which the valve is opened by the presence of a pilot flame and is closed upon over-temperature conditions by the operation of a thermostatic element in direct association with the medium being heated by the main gas burner.

A still further object of my invention is to provide an over-temperature shut-off and flame safety valve in which a single valve, biased into a closed position, is opened against its bias by the heat of a pilot flame and is released to move to a closed position by a power type thermostatic element in direct association with the medium being heated by the gas burner.

A still further object of my invention is to provide a novel and improved form of gas valve in which a single shut-off valve controls the flow of gas to a gas burner and is biased to a closed position, wherein the valve is opened by a mercury filled bulb in association with the pilot burner, and is closed by a power type of thermostatic element in direct association with the medium being heated, the movable parts of which are entirely out of contact with the medium being heated.

Figure 1:
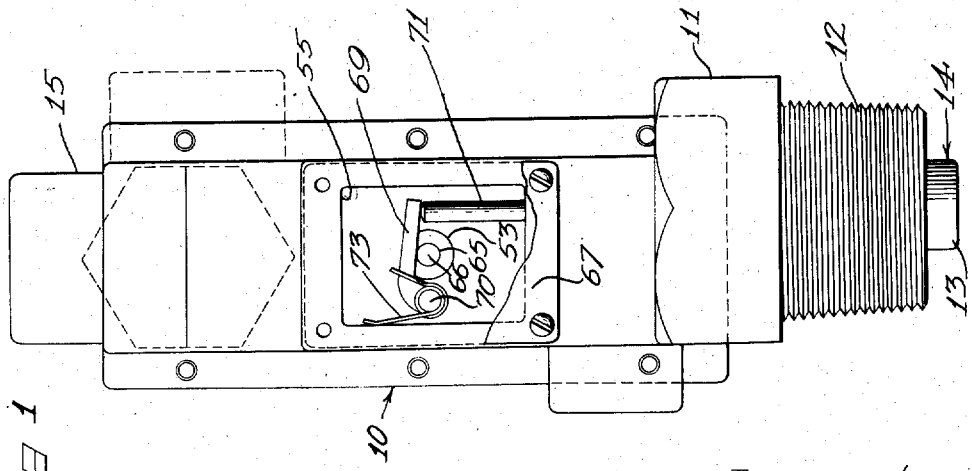

These and other objects of my invention will appear from time to time as the following specification proceeds with reference to the accompanying drawing wherein:

Figure 1 is an end view of a valve constructed in accordance with my invention, with a part of the end plate broken away in order to show certain details of the over-temperature shut-off for the valve; and Figure 2 is a transverse sectional view taken through the valve.

In the embodiment of my invention illustrated in the drawing, I have shown a two part valve body 10 comprising a casing part 11 having a generally frusto-conical threaded boss 12 extending from an end thereof, adapted to be threaded within the wall of a hot water heater to immerse a stationary casing part 13 of a thermostatic element 14 in the water being heated.

The casing part 11 abuts and is closed by a valve part 15 having a port 16 in communication with a hollow interior chamber 17 of the casing part 11, and having a valve chamber 19 in communication with said port. The port 16 terminates into an annular seat 18, within the valve chamber 19, adapted to be engaged by the face of a disk or poppet valve 20, having a valve stem 21 extending from opposite sides thereof. The end of the valve stem 21 within the chamber 19 has an enlarged diameter end portion 22 slidably guided within an annular wall 23 extending inwardly from a threaded closure plug 24. The closure plug 24 is shown as being threaded within the valve body part 15 and as having an annular recess 25, within which is seated a compression spring 27 engaging the valve 20 and biasing said valve into a closed position. An outlet 29 is shown as leading from the valve chamber 19.

An inlet 30 is shown as leading through the wall of the casing part 11 into the hollow interior 17 thereof, for admitting gas to pass through the port 16 and out the outlet 29 to supply gas to a main gas burner (not shown).

The valve body part 15 has an outwardly opening chamber 31 formed therein, spaced from the chamber 19 and closed by an end plate 33 of an expansible diaphragm 34 of a mercury vapor thermostat 35. As herein shown, a tube 36 leads from the diaphragm 34 and has a mercury filled bulb 37 on its end, which may be disposed adjacent a pilot burner 39, to be heated by the flame thereof, to expand the diaphragm or bellows 34, as is well known to those skilled in the art, so not herein shown or described further. The diaphragm or bellows 34 is shown as having a plunger or button 40 on the end thereof, engageable with a disk 41 on the outer end of a plunger 42, slidably guided in the wall of the casing part 15. Suitable spring means, herein shown as being a conical spring 43, seated at its enlarged diameter end on the inner wall of the chamber 31, and seated at its small diameter end on the disk 41, is provided to retractibly move the plunger 42 and diaphragm 34.

The plunger 42 is shown as engaging a concave end 45 of a lever arm 46. The lever arm 46 has an opposite concave end portion 47 engaging the inner end of the valve stem 21. The fulcrum of the lever arm 46 is shown as reacting against an abutment member, such as a collar 49 on an adjustable pin 50. The lever arm 46 is shown in Figure 2 as converging to an apex at its center and as engaging the collar 49 at its apex. Said lever arm is shown as having an aperture 51 extending therethrough at its apex, through which extends the pin 50. The pin 50 is shown as being threaded at its inner end within a reaction plunger 53, slidably guided in an outer wall 54 of the casing part 11, and extending outwardly therefrom within a recessed portion 55 thereof. A compression spring 56 is shown as being interposed between a shouldered recess 58 of the inner wall of the casing part 10, and the flanged inner end 57 of the reaction plunger 53, for biasing said plunger inwardly within the hollow interior 17 of the casing part 11. The end of the pin 50 opposite from the plunger 53 is shown as being shouldered, and as having a washer 59, abutting the shoulder portion thereof, and retained in engagement therewith by a spring 60. The opposite end of the spring 60 from the washer 59 is shown as abutting a threaded plug 61 threaded within the valve body part 15. The outer end of the pin 50 is shown as being slotted as indicated by reference character 63, to receive a screw driver or the like to adjust the position of the collar 49 and the fulcrum point of the lever 46 and vary the temperature at which the valve is opened by the plunger 42.

The reaction plunger 53 is shown as having a shoulder 65 within the recess 55 of the casing part 11, with an integral pin 66 extending outwardly from the shouldered portion thereof and slidably guided in a cover plate 67 for the recess 55. The pin 66 serves as a manual reset, to enable the plunger 53 to be depressed to reset the reaction collar 49 to accommodate opening of the valve, and accommodate the shoulder 65 thereof to be engaged by a latch 69 to hold the plunger 53 and collar 49 in a valve opening position.

The latch 69 is shown as being pivoted within the recessed portion 55 of the casing part 11 on a pivot pin 70 and as extending beyond the shoulder 65 and reset pin 66 to be engaged by a plunger or piston 71, extensible from the thermostatic element 14. A torsion spring 73 is shown as encircling the pivot pin 70 and as engaging a wall of the recess 55 at one of its ends, and the latch 69 at its opposite end, to bias the latch 69 to engage the reset pin 66 and shoulder 65, and retain the reaction plunger 53 and fulcrum 49 in position to effect operation of the lever 46, to open the valve 20.

The thermostatic element 14 is shown as being of the so-called power type element, such as is shown and described in the Vernet Patent No. 2,128,274, dated August 30, 1938, and is frequently referred to as a "Vernay" thermostatic element. The present type of element has been selected for its extreme power in comparison with other types of thermostatic elements and the relatively long range of travel of the piston thereof which is many times greater with far more power than other thermostatic elements, to provide a positively acting release for the latch 69. In the "Vernay" types of thermostatic elements, a thermal deformable medium (not shown) is carried in the casing 13 for the element and acts against a membrane or deformable member (not shown), to extend the plunger or piston 71 from a cylinder 74 of the thermostatic element. As herein shown, the cylinder 74 of the thermostatic element is threaded within a flanged threaded coupling 75, which in turn is threaded within a passageway 76 within which the piston 71 extends. A compression spring 77 is shown as encircling the piston 71 and as being interposed between a reduced diameter portion 80 of the passageway 76 and a flange or collar 81 on the piston 71, to retract the piston 71 within the cylinder 74 upon a predetermined reduction in temperature.

When the threaded boss containing the thermostatic element 13, has been threaded within the wall of a hot water heater, to immerse the thermostatic element 14 in the water in the heater, and the mercury filled bulb 37 is in position adjacent the pilot 39, to be heated by the flame thereof, and the latch 69 is in engagement with the shoulder 65 of the plunger 53, expansion of the diaphragm or bellows 34 will extend the plunger 42 within the chamber 17 and pivot the lever 46 about its point of engagement with the collar 49. This will open the valve 20 against the spring 27, to accommodate the free flow of gas from the inlet 30 through the outlet 29 to the main gas burner. If the pilot should go out at any time, the spring 43 will retractibly move the plunger 42, and the compression spring 27 will move the valve 20 into engagement with its seat 18, to close off the supply of gas to the main gas burner.

When, however, the pilot burner has been ignited, the heat of the burner will maintain the diaphragm or bellows 34 extended, to hold the shut off valve 20 open as long as the pilot burner is lit.

In case of over-temperature conditions, where the temperature of the hot water may approach the boiling point of water, the piston 71 will be extended from the cylinder 74 to pivot the latch 69 out of engagement with the shoulder 65. The compression spring 60 will then retractably move the lever 46 and plunger 53 against the spring 56, retracting the fulcrum or reaction collar 49, and accommodating the spring 27 to close the valve 20 and shut off the supply of gas to the main gas burner.

If the pilot burner should remain on after closing of the valve 20, the plunger 71 extended from the cylinder 74 within the chamber 76 will be ineffective to open the valve until the over-temperature conditions are relieved. This may be the case even though pressure should be applied to the reset pin 66 to move reaction collar 49 inwardly to provide a fulcrum for the lever 46, for the piston 71 will hold the latch 69 out of engagement with the shoulder 65, and the instant the hand is removed from the reset pin 66, the spring 27 will again shut the valve.

When, however, the spring 77 has retractibly moved the piston 71 within the cylinder 74 upon a reduction in temperature of the water to a safe value, the torsion spring 73 will bias the latch 69 into position to engage the shoulder 65 of the reaction plunger 53. Upon pushing of the reset pin 66 to depress the same and the reaction plunger 53, the spring 73 will then engage the latch 69 with the shoulder 65 of the reaction plunger 53 and hold the valve open. If the pilot should be out and the reset pin 66 has been depressed, the latch will hold the fulcrum collar 49 in position to accommodate the plunger 42 to fulcrum the lever 46 about the point of engagement thereof with the collar 49, to open the valve 20 when the pilot 39 is lit and the mercury filled bulb 37 is heated to an extent sufficient to expand the bellows 34.

It will be understood that modifications and variations may be effected in the present invention without departing from the scope of the novel concepts thereof.

I claim as my invention:

1. A fluid control safety valve particularly adapted to supply gas to a main gas burner comprising a valve body having a chamber therein, an inlet into said chamber, an outlet from said chamber, a valve controlling the passage of gas from said inlet to said outlet, a spring biasing said valve into a closed position, a thermal responsive element, means operated by said thermal responsive element for opening said valve upon a predetermined temperature rise caused by the heat of a pilot flame, a latch maintaining said means in position to retain said valve in an open position, and a power type thermostatic element having an extensible piston engageable with said latch upon over-temperature conditions, to release said latch and accommodulate said spring to close the valve.

2. A fluid control valve particularly adapted to control the flow of fluid to a main gas burner comprising a valve body having a valve chamber therein, an inlet into said chamber, an outlet from said chamber, a valve controlling the passage of fluid from said inlet through said outlet, a spring biasing said valve to a closed position, a thermostat, valve opening means operated by said thermostat for opening said valve against the bias of said spring, a latch reacting against said valve opening means, to hold said valve opening means in position to effect opening of said valve by said valve opening means upon operation of said thermostat, and means releasing said latch on over-temperature conditions to effect closing of the valve by said spring comprising a power type thermostatic element including a cylinder having a piston extensible therefrom for engagement with said latch, to release the same.

3. A fluid control valve particularly adapted to control the flow of fluid to a main gas burner comprising a valve body, a chamber within said body, an inlet into said chamber, an outlet from said chamber, a valve controlling the passage of gas from said inlet through said outlet, a spring biasing said valve in a closed position, an extensible plunger, a thermostatic element for extending said plunger, a lever arm operated by said plunger and having engagement with said valve to open the same upon extensible movement of said plunger, a fulcrum for said lever arm holding said lever arm in position to open the valve by extension of said plunger, a latch holding said fulcrum in a valve opening position, a power type thermostatic element threaded into said valve body and having a piston extensible therefrom for engagement with said latch to release the same upon predetermined over-temperature conditions, to release said fulcrum and accommodate said valve to close by its spring bias.

4. In a thermostatic operated gas valve particularly adapted to control the supply of gas to gas burners, a valve body having a valve chamber therein, an inlet into said chamber, an outlet therefrom, a valve controlling the passage of gas from said inlet through said outlet, a spring biasing said valve into a closed position, an extensible plunger movable within said valve body and spaced from said spring, a thermostatic element for extending said plunger upon predetermined temperature rises, a lever arm having engagement with said plunger at one of its ends and with said valve at its opposite end, a movable fulcrum member for said lever arm, a latch holding said fulcrum member in a valve operating position to accommodate said plunger to pivot said lever to open said valve upon extensible movement of said plunger, a power type thermostatic element outside of said valve body and having a cylinder, a piston extensible from said cylinder within said valve body and positioned to engage said latch upon extensible movement thereof to release said movable fulcrum and accommodate said valve to close by its spring bias.

5. A thermostatically operated gas shut-off valve comprising a valve body having a valve chamber therein, an inlet into said chamber, an outlet therefrom, a port connecting said inlet with said outlet and having an annular valve seat, a valve engageable with said seat to block the passage of fluid from said inlet through said outlet, a spring engaging said valve and biasing said valve into a closed position, a plunger extensible within said chamber and spaced from said valve, a spring retractibly moving said plunger with respect to said chamber, a lever arm engaged by said plunger at one of its ends and having operative engagement with said valve at its opposite end, said lever arm converging to an apex intermediate the ends thereof and fulcruming about its apex, a pin extending through the apex of said lever arm and having an abutment member thereon abutted by the apex of said lever arm, a reaction plunger connected with said pin, a latch engageable with said reaction plunger for holding said reaction plunger and collar in position to react against said lever arm and form a fulcrum therefor, a thermostatic element for extending said first mentioned plunger within said chamber upon the presence of a pilot flame, and a power-type thermostatic element having a casing outside of said valve body for immersion in the medium to be heated, a cylinder extending within said valve body, and a piston extensible from said cylinder for engagement with said latch to release the same upon predetermined over-temperature conditions to release said reaction plunger and fulcrum and accommodate the valve to close by the biasing spring thereof.

6. An over-temperature safety gas valve particularly adapted for hot water heaters, comprising a valve body having a chamber therein, an inlet into said chamber, an outlet from said chamber, an annular valve seat between said inlet and outlet and defining a fluid passageway therebetween, a valve engageable with said seat and having a valve stem projecting through the passageway defined thereby, a spring biasing said valve into a closed position, a plunger extensible within said chamber and spaced from said valve stem and parallel thereto, a spring retractibly moving said plunger, a thermostatic element for extending said plunger upon the presence of a pilot flame, a lever engaging said plunger at one end and said valve stem at its opposite end, said lever being of a generally V-shaped formation and having an opening extending through the apex thereof, a pin extending through said opening, an abutment member on said pin engaging said lever at the apex thereof and forming a fulcrum therefor, a reaction plunger carrying said pin, said reaction plunger having a shoulder thereon and a reset pin extending outwardly therefrom outside of said casing, a pivoted latch, a spring for biasing said latching into engagement with the shoulder of said reaction plunger, and means for releasing said latch from said shoulder to release the fulcrum point of said lever and accommodate said valve to close by the bias of its spring upon over-temperature conditions comprising an extensible piston engageable with said latch upon over-temperature conditions and holding said latch in a released position until relief of the over-temperature conditions.

7. An over-temperature safety gas valve particularly adapted for hot water heaters, comprising a valve body having a chamber therein, an inlet into said chamber, an outlet from said chamber, an annular valve seat between said inlet and outlet and defining a fluid passageway therebetween, a valve engageable with said seat and having a valve stem projecting through the passageway defined thereby, a spring biasing said valve into a closed position, a plunger extensible within said chamber and spaced from said valve stem and parallel thereto, a spring retractibly moving said plunger, a thermostatic element for extending said plunger upon the presence of a pilot flame, a lever engaging said plunger at one end and said valve stem at its opposite end, said plunger being of a generally V-shaped formation and having an opening extending through the apex thereof, a pin extending through said opening, an abutment member on said pin engaging said lever at the apex thereof and forming a fulcrum therefor, a reaction plunger carrying said pin, said reaction plunger having a shoulder thereon and a reset pin extending outwardly therefrom outside of said casing, a pivoted latch, a spring for biasing said latch into engagement with the shoulder of said reaction plunger, and means for releasing said latch from said shoulder to release the fulcrum point of said lever and accommodate said valve to close by the bias of its spring upon over-temperature conditions comprising an extensible piston engageable with said latch upon over-temperature conditions and holding said latch in a released position until relief of the over-temperature conditions, and a power type thermostatic element secured to said valve body having a casing on the outside thereof for immersion in the hot water, and having a cylinder extending therefrom having said piston mounted therein for extension therefrom upon predetermined over-temperature conditions.

8. In an over-temperature safety for gas hot water heaters, a main burner gas valve including a valve body having a valve chamber therein an inlet into said chamber and an outlet therefrom, a valve controlling the flow of gas through said outlet, a spring biasing said valve into a closed position, a thermostat for opening said valve having a plunger movable within said body upon the presence of a pilot flame, a valve operating lever engaged by said plunger and having operative engagement with said valve, a fulcrum for said lever, a latch holding said fulcrum in position to effect opening of said valve upon movement of said plunger within said valve body, a power type thermostatic element secured to said valve body on the outside thereof for immersion in the water being heated and having a piston movable within said valve body to release said latch upon over-temperature conditions.

9. In an over-temperature safety device for gas hot water heaters, a gas control valve having a valve body having a valve chamber therein, an inlet into said chamber, an outlet therefrom, a valve seat between said inlet and said outlet, a valve engageable with said seat and having a stem extending therefrom through the opening defining said seat, a spring biasing said valve into engagement with said seat, means for opening said valve upon the presence of a pilot flame comprising a mercury filled bulb adapted to be positioned adjacent a pilot burner and heated by the flame thereof, a bellows expanded by the gases created by the heating of said bulb, a plunger movable within said body upon expansion of said bellows, said plunger being spaced from and extending parallel with said valve stem, a valve operating lever engaged by said plunger and engaging said valve stem, a fulcrum for said lever, a latch holding said fulcrum in position to effect opening of said valve, a piston engageable with said latch for releasing the same upon over-temperature conditions and accommodating said biasing spring of said valve to pivot said lever about said first mentioned plunger and close said valve, and a power type thermostatic element adapted to be immersed in the water being heated and to extend said piston to release said latch upon over-temperature conditions.

*10. A fluid control safety valve particularly adapted to supply gas to a main gas burner comprising a valve body having a chamber therein, an inlet into said chamber, an outlet from said chamber, a valve controlling the passage of gas from said inlet to said outlet, a spring biasing said valve into a closed position, a thermal responsive element, means operated by said thermal responsive element for opening said valve upon a predetermined temperature rise caused by the heat of a pilot flame, a latch maintaining said means in position to retain said valve in an open position, and a thermostatic element operatively associated with said latch for releasing said latch and said means upon over-temperature conditions and accommodating said spring to close said valve.*

*11. A fluid control valve particularly adapted to control the flow of fluid to a main gas burner comprising a valve body having a valve chamber therein, an inlet into said chamber, an outlet from said chamber, a valve controlling the passage of fluid from said inlet through said outlet, a spring biasing said valve to a closed position, a thermostat, valve opening means operated by said thermostat for opening said valve against the bias of said spring, a latch reacting against said valve opening means, to hold said valve opening means in position to effect opening of said valve by said valve opening means upon operation of said thermostat, and means releasing said latch on over-temperature conditions to effect closing of the valve by said spring comprising a thermostatic element operatively associated with said latch, to release said latch upon operation of said thermostatic element.*

*12. A fluid control valve particularly adapted to control the flow of fluid to a main gas burner comprising a valve body, a chamber within said valve body, an inlet into said chamber, an outlet from said chamber, a valve controlling the passage of gas from said inlet through said outlet, a spring biasing said valve in a closed position, a lever operatively associated with said valve, a first thermostatic element associated with said lever and operable to operate said lever to open said valve, a movable fulcrum for said lever normally forming a fulcrum about which said lever may be operated by said first thermostatic element to open said valve, a latch holding said fulcrum in its normal fulcruming position, and a second thermostatic element operatively associated with said latch for releasing said fulcrum upon over-temperature conditions and accommodating said spring to close said valve.*

References Cited in the file of this patent or the original patent.

UNITED STATES PATENTS

| | | |
|---|---|---|
| 1,953,446 | Strong | Apr. 3, 1934 |
| 2,128,274 | Vernet | Aug. 30, 1938 |
| 2,154,518 | Long | Apr. 18, 1939 |
| 2,163,801 | Newell | June 27, 1939 |
| 2,412,235 | Van Denberg | Dec. 10, 1946 |
| 2,457,378 | Johnson et al. | Dec. 28, 1948 |
| 2,527,117 | Cobb | Oct. 24, 1950 |
| 2,576,675 | Drow | Nov. 27, 1951 |
| 2,591,897 | Weber | Apr. 8, 1952 |
| 2,610,678 | Eskin et al. | Sept. 16, 1952 |